US011226537B2

(12) United States Patent
Dorche et al.

(10) Patent No.: US 11,226,537 B2
(45) Date of Patent: Jan. 18, 2022

(54) MULTI-LAYER OPTICAL DEVICE EXHIBITING ANOMALOUS DISPERSION

(71) Applicant: Palo Alto Research Center Incorporated, Palo Alto, CA (US)

(72) Inventors: Ali Eshaghian Dorche, Atlanta, GA (US); Thomas Wunderer, Santa Cruz, CA (US); Noble M. Johnson, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/783,668

(22) Filed: Feb. 6, 2020

(65) Prior Publication Data

US 2021/0247662 A1   Aug. 12, 2021

(51) Int. Cl.
| | |
|---|---|
| *G02F 1/365* | (2006.01) |
| *G02F 1/35* | (2006.01) |
| *G02F 1/39* | (2006.01) |
| *G02B 6/10* | (2006.01) |

(52) U.S. Cl.
CPC .............. *G02F 1/365* (2013.01); *G02F 1/353* (2013.01); *G02F 1/3528* (2021.01); *G02F 1/3536* (2013.01); *G02F 1/395* (2013.01); *G02B 6/105* (2013.01); *G02F 2203/56* (2013.01)

(58) Field of Classification Search
None
See application file for complete search history.

(56) References Cited

U.S. PATENT DOCUMENTS

| | | | |
|---|---|---|---|
| 9,110,219 B1* | 8/2015 | Zhang | G01J 1/0425 |
| 2016/0327743 A1 | 11/2016 | Kippenberg et al. | |
| 2018/0205463 A1* | 7/2018 | Karpov | G02F 1/073 |
| 2018/0307118 A1* | 10/2018 | Sciancalepore | G02F 1/3536 |
| 2019/0296512 A1* | 9/2019 | Wong | G02F 1/3536 |
| 2020/0201138 A1* | 6/2020 | Lin | G02F 1/3511 |
| 2021/0063646 A1* | 3/2021 | Yao | G02F 1/353 |

FOREIGN PATENT DOCUMENTS

RU          2332696          8/2008

OTHER PUBLICATIONS

Chembo, "Kerr optical frequency combs: theory, applications and perspective", Nanophotonics 5 (2), 2016, pp. 214-230.

(Continued)

*Primary Examiner* — Michelle R Connelly
(74) *Attorney, Agent, or Firm* — Mueting Raasch Group

(57) ABSTRACT

An optical device has a first optical layer with a first dispersion response as a first function of wavelength. A second optical layer has a second dispersion response as a function of wavelength that is different than the first function. A separating layer is located between the first and second optical layers and has a lower refractive index than the first layer and the second layer. A thickness of the separating layer is selected such that the first and second dispersion responses combine to create an anomalous dispersion about a target wavelength. The anomalous dispersion results in the optical device emitting a wideband coherent optical output about the target wavelength in response to an optical input at the target wavelength.

18 Claims, 9 Drawing Sheets

(56) References Cited

OTHER PUBLICATIONS

De Leonardis et al. "Broadband biphoton generation and statistics of quantum light in the UV-visible range in an AlGaN microring resonator" Scientific reports 7.1 (2017): 11387.
Dorche et al., "Advanced dispersion engineering based on on-demand anti-crossing for efficient bright solition formation at near Ultraviolet spectrum", Optic Letters, Oct. 30, 2019, 5 pages.
Kneissl et al. "Ultraviolet semiconductor laser diodes on bulk AlN" Journal of Applied Physics 101.12 (2007): 123103.
Kneissl et al. "Ultraviolet InAlGaN multiple-quantum-well laser diodes" physica status solidi (a) 200.1 (2003): 118-121, Abstract Only.
Li et al. "AlGaN photonics: recent advances in materials and ultraviolet devices" Advances in Optics and Photonics 10.1 (2018): 43-110.
Lu et al. "Aluminum nitride integrated photonics platform for the ultraviolet to visible spectrum" Optics express26.9 (2018): 11147-11160.
Soltani et al. "AlGaN/AlN integrated photonics platform for the ultraviolet and visible spectral range" Optics express 24.22 (2016): 25415-25423.
Zhang et al., "Highly dispersive slot waveguides", Optics Express, vol. 17, No. 9, Apr. 27, 2009, 7095-7101.
European Search Report from EP Application No. 21152632.2 dated Jun. 17, 2021, 10 pages.

* cited by examiner

MULTI-LAYER OPTICAL DEVICE EXHIBITING ANOMALOUS DISPERSION

SUMMARY

The present disclosure is directed to the design of a multi-layer optical device exhibiting a desired anomalous dispersion characteristic. In one embodiment, an optical device has a first optical layer with a first dispersion response as a first function of wavelength. A second optical layer has a second dispersion response as a function of wavelength that is different than the first function. A separating layer is located between the first and second optical layers and has a lower refractive index than the first layer and the second layer. A thickness of the separating layer is selected such that the first and second dispersion responses combine to create an anomalous dispersion about a target wavelength. The anomalous dispersion results in the optical device emitting an output in response to an optical input at the target wavelength. The output may include a wideband coherent optical output about the target wavelength and/or optical information at a speed greater than 1 GHz.

In another embodiment, a method involves selecting first and second materials for first and second optical layers of an optical device, the first and second materials having different dispersion responses as a function of wavelength. The first and second optical layers are formed with a separating layer therebetween. The separating layer has a lower refractive index than the first and second layers. The first and second material layers have a geometry that, together with the first and second materials, result in the first and second optical layers and the separating layer forming a heterostructure of the optical device with an anomalous dispersion about a target wavelength. An optical input is coupled into the heterostructure. The optical input may include an optical continuous-wave or pulsed laser at the target wavelength. The anomalous dispersion of the heterostructure results in the emission of a wideband coherent optical output signal about the target wavelength in response to the optical input.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to the design of optical devices. Ultrashort optical pulses (optical frequency combs, supercontinuum sources, etc.) have garnered much attention for their unique potential in optical metrology, information processing, and more recently quantum information processing applications, to name a few. There are molecular fingerprints in the ultra-violet (UV) part of the electromagnetic spectrum, which makes coherent optical sources at such wavelengths highly desirable for spectroscopic applications. Also, there are atomic transitions at UV wavelengths (e.g., Yb+) which can be used for developing accurate atomic clocks or scalable quantum computers using trapped ions/atoms within integrated photonics platforms. Furthermore, there has been interest in quantum computing for qubit initialization and logic-gate operations performed with short optical pulses and in the use of the Raman transition between atomic levels, which can enable integrated photonic platforms for quantum information processing.

The total chromatic dispersion (which leads to a spreading in time of the amplitude) experienced by an optical pulse propagating in a dielectric wave-guiding structure is a combination of material and waveguide dispersion effects. An ingredient for generating ultra-wideband coherent light is "anomalous" dispersion, which is the property of a waveguide or resonator that keeps a pulse from spreading while it propagates. Devices and method described below can solve the problems of overcoming the strong "normal" material dispersion typically exhibited by optical materials at UV wavelengths. This is achieved through the design of a layered structure that has an even stronger anomalous waveguide dispersion that more than compensates for the normal material dispersion, thus making it possible to generate and sustain a high-intensity, ultra-short optical pulse. Anomalous dispersion is useful for the formation of a bright Kerr soliton via broadband power transfer to the sidebands of a pumped resonator mode, as it counteracts nonlinear dispersion and thus enables favorable conditions to be maintained for simultaneous energy and momentum conservation necessary for efficient four-wave mixing.

Figure 1:
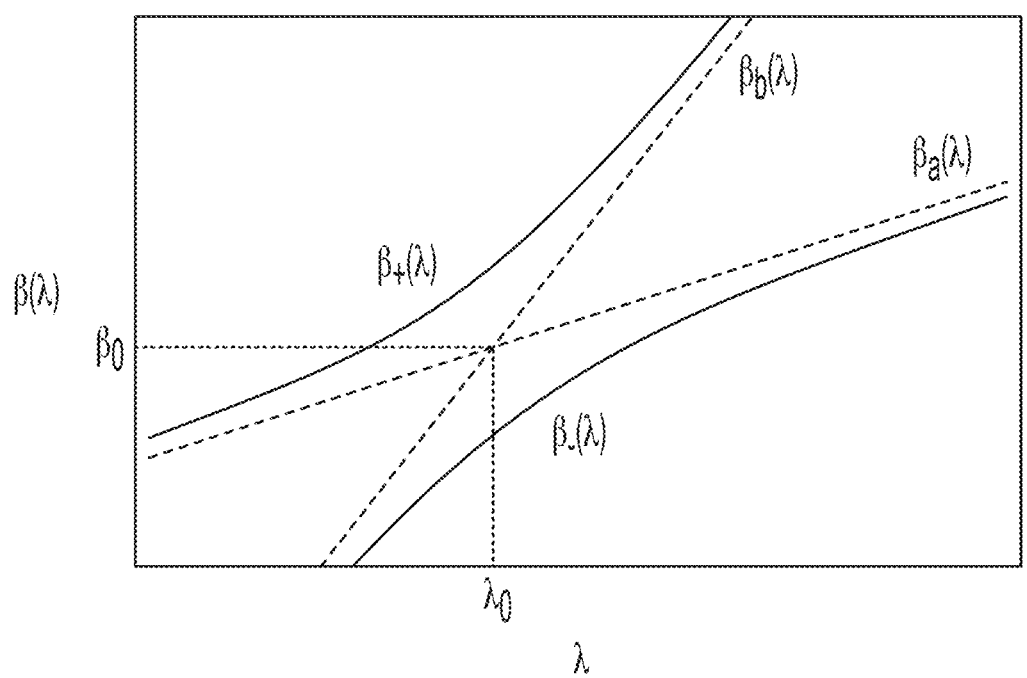
FIG. 1 is a diagram illustrating mode crossing avoidance that affects optical dispersion according to an example embodiment.

A device with anomalous waveguide dispersion can be designed based on the "avoided crossing" behavior of the dispersion curve for a layered waveguide structure, similar to the energy level repulsion mechanism observed in strongly coupled oscillators. The avoided crossing behavior of optical dispersion is shown in the simplified diagram of FIG. 1. Generally, the straight lines indicate the asymptotic behavior of the chromatic dispersion of modes in two isolated optical waveguides. When the two guides are brought into close proximity, the emerging coupled structure supports "supermodes" whose dispersion curves are a composite of the isolated-mode dispersion curves, as indicated by the solid curves in the figure. Most notably, at the optical wavelength $\lambda_0$ where the two isolated-mode dispersion curves intersect, the supermode dispersion curves exhibit the so-called avoided crossing behavior seen in the figure.

This behavior can potentially be harnessed to achieve net anomalous dispersion in an optical heterostructure 200 (also referred to generally as an optical device) as shown in FIG.

2. When two ordinary guide layers 201, 202 that support modes with normal dispersion are brought into close proximity, the supermode of the coupled structure has an effective refractive index n(λ). If the geometry and the material composition of the heterostructure are chosen judiciously, one can tailor this effective refractive index such that a large positive dispersion coefficient $D_\lambda$ is obtained over a band of wavelengths near the avoided-crossing wavelength $\lambda_0$, thus achieving the desired anomalous dispersion effect. Effectively, the (desirable) anomalous waveguide dispersion exceeds the (undesirable) normal material dispersion over this band of wavelengths, thus enabling the build-up of an optical soliton (a high-intensity, ultra-short optical pulse) in the heterostructure. The phase matching condition between different layers of the heterostructure 200 provides a means for systematic dispersion engineering avoided-crossing wavelength $\lambda_0$, which can be tuned by adjusting the alloy composition and geometrical parameters.

A separating layer 203 between the guide layers 201, 202 is filled with a growth-compatible material with a different refractive index, e.g., one having lower refractive index than that of the guide layers 201, 202. A thickness of the separating layer 203 determines the bandwidth and "repulsion force" splitting the composite dispersion curves, with larger gaps enabling very strong curvature (strong level repulsion) over a narrow bandwidth, while thinner gaps lead to milder curvatures but over broader bands. In the embodiments shown, the thickness of the separating layer is less than the target wavelength in order to facilitate strong coupling between the two neighboring guides in the heterostructure.

The coupling between two different layers with different group-velocities causes hybridization of the dispersion curves, providing anti-crossing should the layers being phase-matched at the desired wavelength and out of phase in other wavelengths. The difference in phase-matching would provide a degree of freedom for shaping the hybrid supermodes in the coupled structure (the dispersion of even and odd-supermodes), inducing anomalous dispersion around the desired spectrum. The differential term in the group velocities manifest itself in additional curvature in the resulting dispersion of hybridized modes, which upon appropriate optimization of the coupling region in-between the layers lead to strong anomalous dispersion being capable of suppressing the remaining strong normal dispersion in photonic waveguide.

Considering two coupled systems with coupling and respective refractive indices $n_1$, $n_2$, the resulting eigenvalues for the odd-supermode would be $n_{e/o} = n_c \pm \sqrt{n_d^2 + k^2} + k2$ in which $n_c = (n_1 + n_2)/2$ and $n_d = (n_1 - n_2)/2$ being the common and differential terms of the refractive indices when considering two coupled layers. The resulting dispersion parameter of the odd-supermode would be as shown in Equation (1) below:

$$D_{e/o} = -\frac{\lambda}{c}\left(\frac{\partial^2 n_c}{\partial \lambda^2} \pm \frac{(n_d^2 + \kappa^2)\left(n_d \frac{\partial^2 n_d}{\partial \lambda^2} + \kappa \frac{\partial^2 \kappa}{\partial \lambda^2}\right) + \left(n_d \frac{\partial \kappa}{\partial \lambda} - \kappa \frac{\partial n_d}{\partial \lambda}\right)^2}{(n_d^2 + \kappa^2)^{3/2}}\right) \quad (1)$$

This is reduced to a coupled oscillator formula when the layers are completely phase matched, such that both lid and its derivative are zero. However, when phase-matching dispersion is present (which means the layers are phase matched at the desired target frequency) together with the coupling term (with additional term results from the group-velocity difference which manipulates the coupling dispersion between layers), this adds an additional degree of freedom for proper dispersion engineering, while considering limitations on the fabrications being necessary to achieve reasonably high-Q devices. This term can be adjusted by proper choice of material parameters to adjust the phase matching wavelength. This selection of materials allows for systematic selection of the spectral region, around which anomalous dispersion can be obtained by adjusting the coupling strength between the layers forming the slot-waveguide. At the central frequency (the phase matching wavelength where the dispersion curves cross and forming anti-crossing in the hybridized band structure), the modes are phase-matched however, their group velocities are not same, such that, $n_d = 0$, but $$\frac{\partial n_d}{\partial \lambda} \ne 0.$$

Therefore, Equation (1) can be simplified at the central frequency as shown in Equation (2).

$$D_{e/o} = -\frac{\lambda}{c}\left(\frac{\partial^2 n_C}{\partial \lambda^2} \pm \left(\frac{\partial^2 \kappa}{\partial \lambda^2} + \frac{\left(\frac{\partial n_d}{\partial \lambda}\right)^2}{\kappa}\right)\right) \quad (2)$$

This indicates the importance of group velocity mismatch whose impact is enhanced by reducing the coupling between layers, e.g., reducing coupling strength between high-index layers. The stronger phase-mismatch at frequencies away from the central phase-matched frequency leads to much weaker coupling at other frequencies, shaping the effective coupling between layers forming the slot-waveguide.

Figure 3:
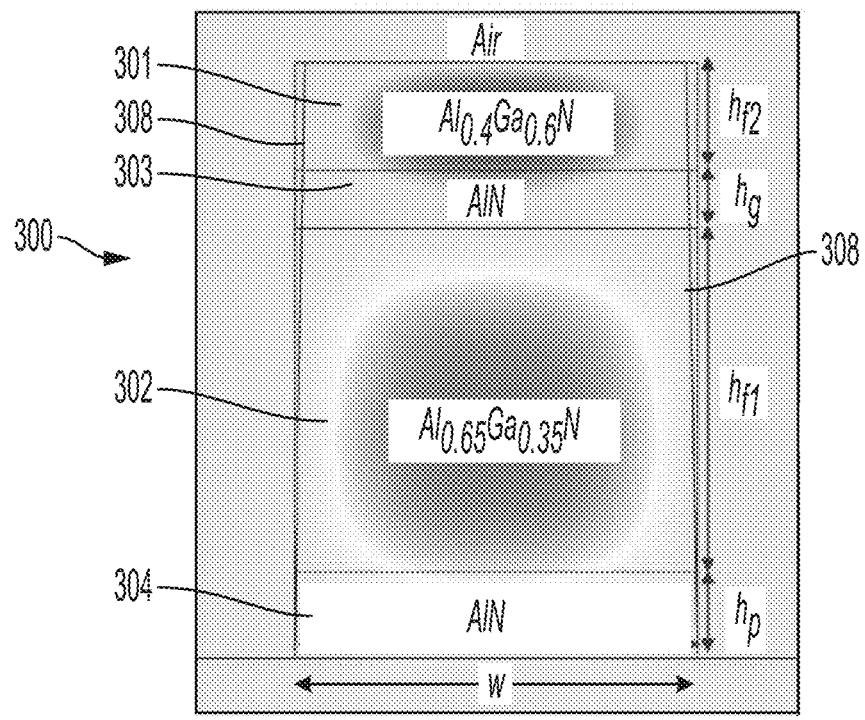

The embodiments described below may potentially use any material system and may be applicable to any part of the optical spectrum. In the UV and visible spectral regime, an AlGaN material platform would be a good candidate for this type of heterostructure given its large bandgap and reasonably strong nonlinear optical properties. In FIG. 3, a diagram shows an AlGaN optical structure 300 according to an example embodiment. First and second AlGaN layers 301, 302 are built on AlN layers 303, 304, with layer 303 being a separating layer and layer 304 being a substrate or template. The shaded regions in FIG. 4 indicates field profiles of fundamental quasi-TE modes at the target wavelength. Using a single crystalline AlN substrate 304 can decrease threading dislocations when fabricating the layers 301-303. By reducing defects in this way, the structure 300 is expected to provide superior optical quality compared to AlGaN on sapphire or other non-native substrates as shown in other embodiments. However, the design is not restricted to AlN as the substrate and/or spacer material, as other lower-cost substrate materials such as silicon, sapphire, GaAs, SiC or GaN can also be potentially used.

Figure 4:
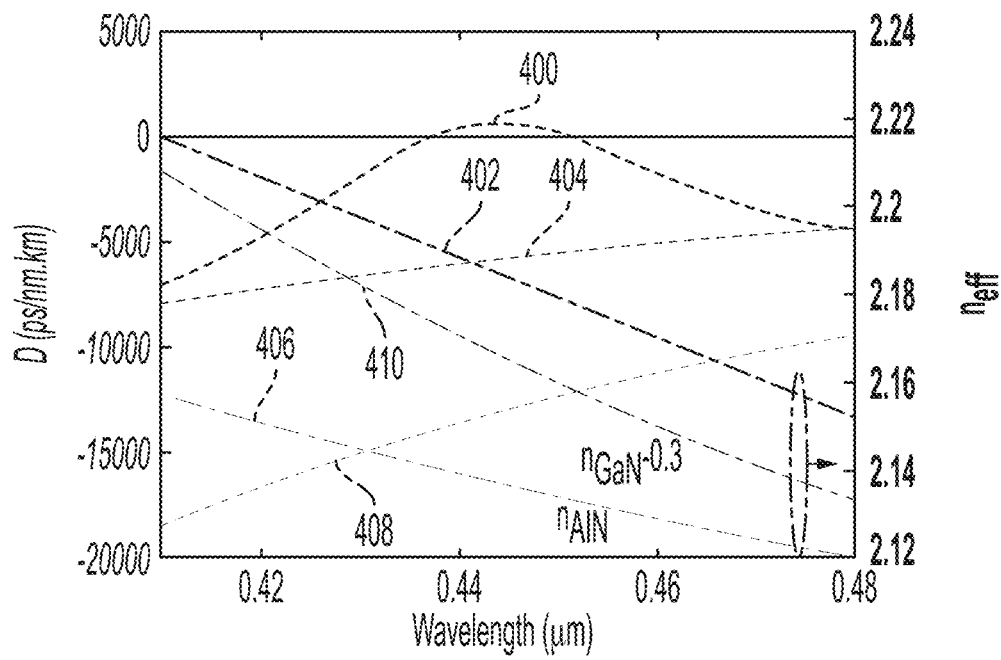
FIGS. 4-8 are graphs showing dispersion characteristics based on a simulation of the optical device shown in FIG. 3.

In one configuration, the dimensions of the structure 300 are w=700 nm, $h_p$=150 nm, $h_{f1}$=440 nm, $h_g$=250 nm, and $h_{f2}$=200 nm. The predicted dispersion performance of this structure 400 is shown in the graph of FIG. 4, with the target wavelength λ≈450 nm. The solid lines indicate the dispersion parameter 400 and refractive index 402 of the waveguide 400. The dashed lines indicate dispersion parameter 404 and refractive index 406 of AlN. The dotted lines indicate dispersion parameter 408 and refractive index 410 of GaN. The refractive indices of AlN and GaN and their corresponding dispersion parameter indicate the strong normal dispersion of the materials at short wavelengths. This graph clearly demonstrates the effectiveness of dispersion engineering based on strong anomalous dispersion induced through optimized anti-crossing to suppress the strong remaining normal dispersion around the pumping wavelength (central wavelength).

While AlGaN is expected to provide an optical device that has the desired performance in the UV/visible spectrum, the principles underlying the embodiments are equally powerful for other material platforms such as other III-V compounds, e.g., AlGaInAs, AlGaInP, the II-VI family or any other binary, ternary, or quaternary, etc. compound for which one can fine-tune bulk material properties by using different alloy compositions. Should any of the materials be non-crystalline, e.g., amorphous, and not provide an appropriate surface for epitaxial growth for the subsequent layer(s), the structure might be realized using selective area growth (SAG) with lateral overgrowth of the non-crystalline portion.

Figure 5:
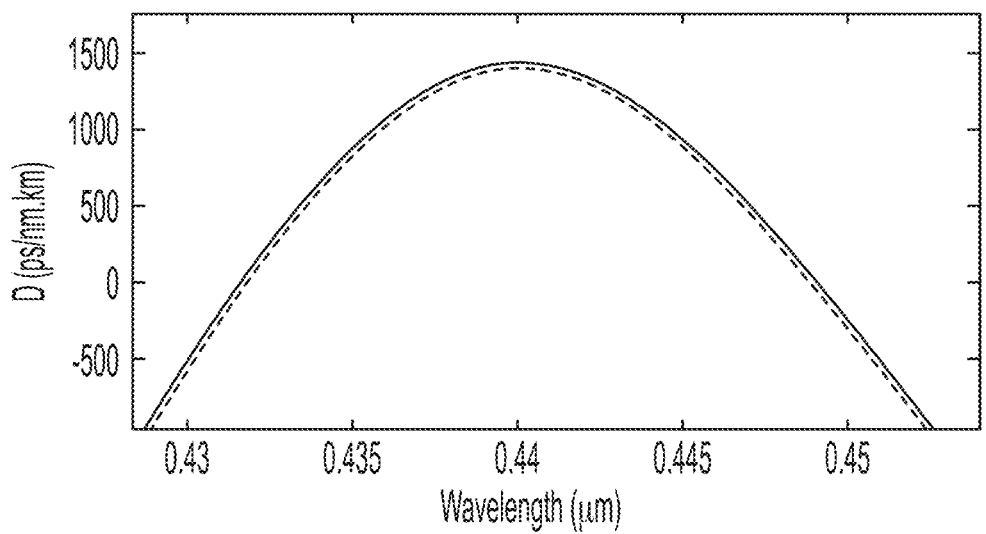
Figure 6:
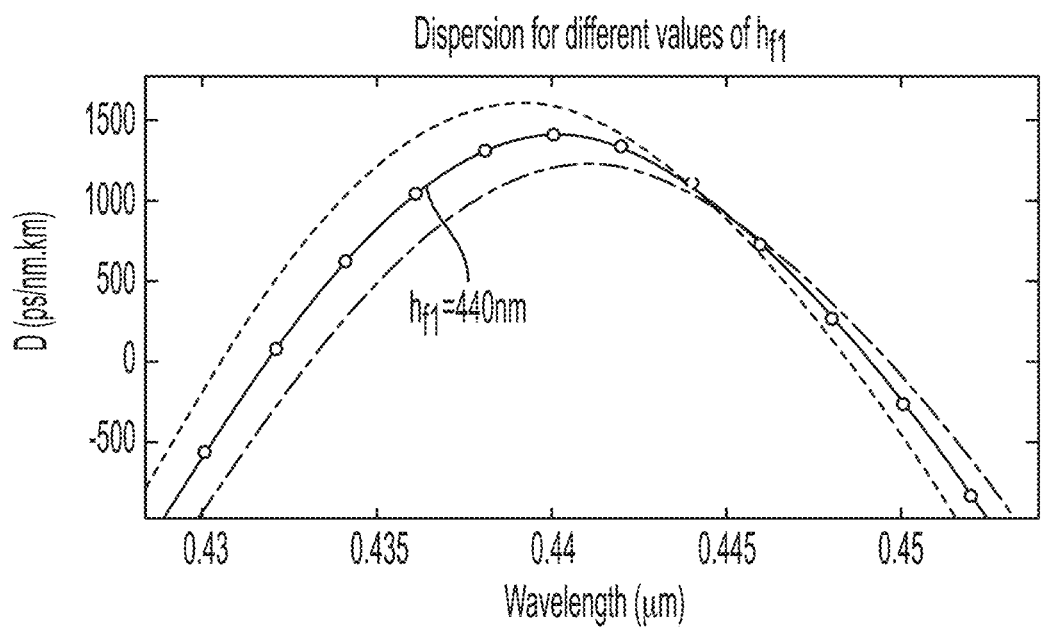
Figure 7:
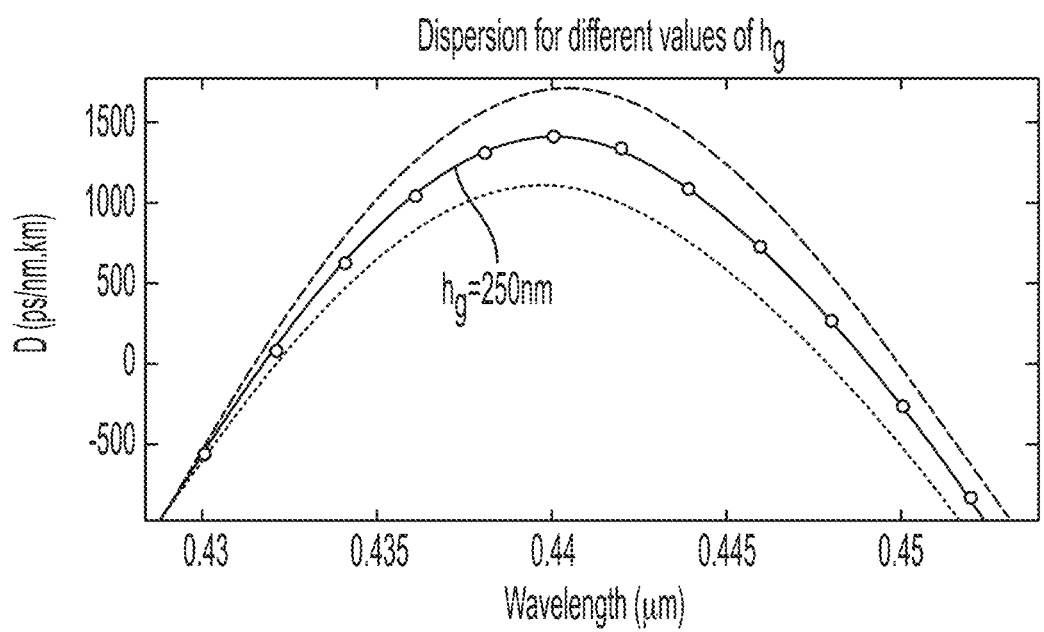
Figure 8:
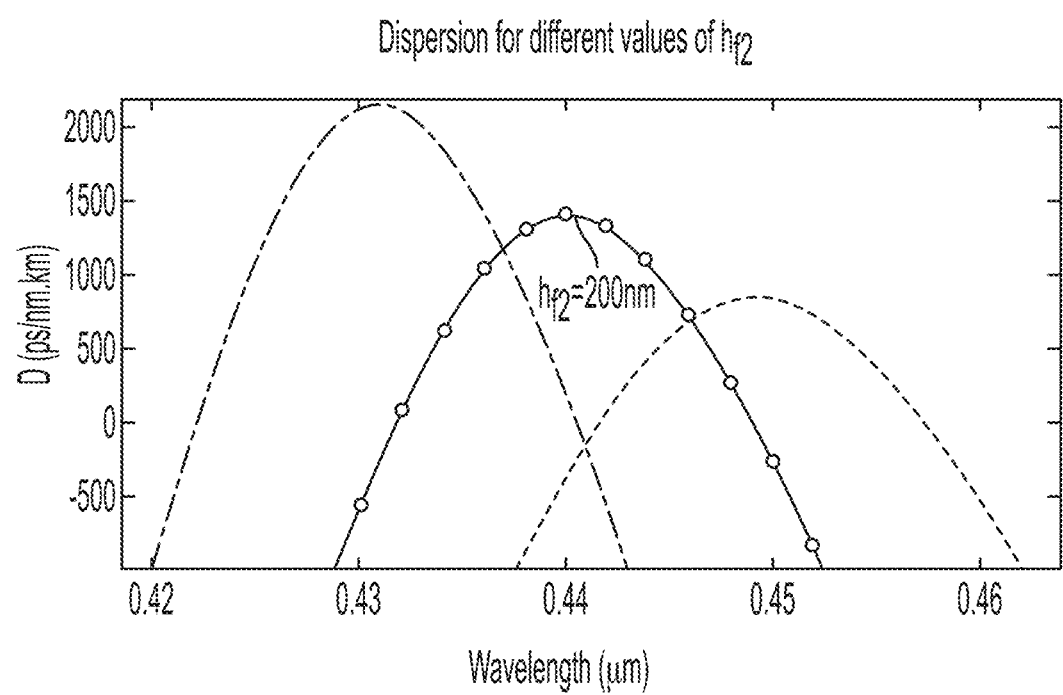

In FIGS. 5-8, graphs show simulations of the waveguide shown in FIG. 4 by where one of the geometrical parameters is changed and all others the kept same. These results indicate the sensitivity of the dispersion parameter to the geometrical parameters which may arise due to fabrication imperfections. In FIG. 5, a graph shows the effect of waveguide width on dispersion parameter for w in range of 680 nm to 720 nm in steps of 20 nm. In FIG. 6, a graph shows the effect on dispersion parameter for deviation of ±5 nm around the 440 nm thickness of waveguide value $h_{f1}$ shown in FIG. 4. This causes a slight shift to the wavelength associated with the dispersion parameter peak value. The graph in FIG. 7 shows the effect on waveguide dispersion due to a ±5 nm deviation of gap thickness from $h_g$=250 nm. The graph in FIG. 8 shows the effect on waveguide dispersion deviation due to a ±5 nm deviation of waveguide thickness $h_{f2}$ around $h_{f2}$=200 nm.

The optical devices described herein can be used in a high-Q optical resonator to obtain a wideband coherent optical source. In one embodiment, the layers can be implemented as a waveguide driven by an optical pulsed laser. In another embodiment, a microcavity formed using a heterostructure with anomalous dispersion can be driven by a single continuous-wave (CW) laser. When this pump signal is tuned to a resonant mode of the cavity or microresonator, it leads to modulational instability followed by cascaded four wave mixing, resulting in a dissipative Kerr soliton covering a broad spectrum around the pumping wavelength, which corresponds in the time domain to a train of ultrashort pulses. This type of device is referred to as a Kerr frequency comb generator.

Figure 9:
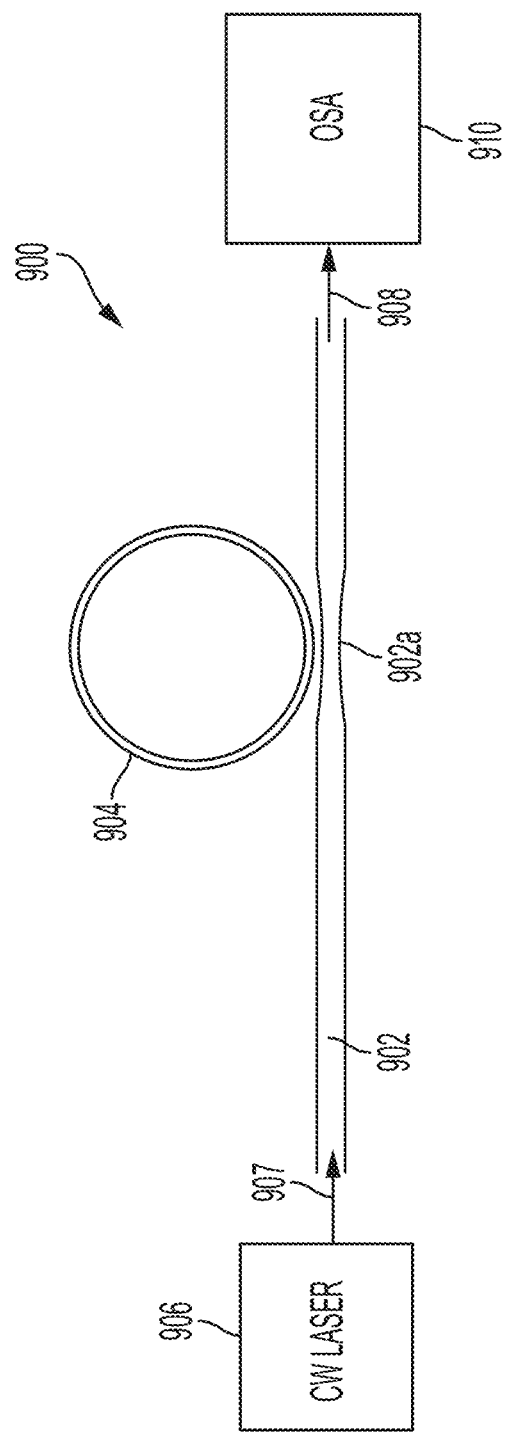
FIG. 9 is a diagram of a comb frequency generator according to an example embodiment.
Figure 10:
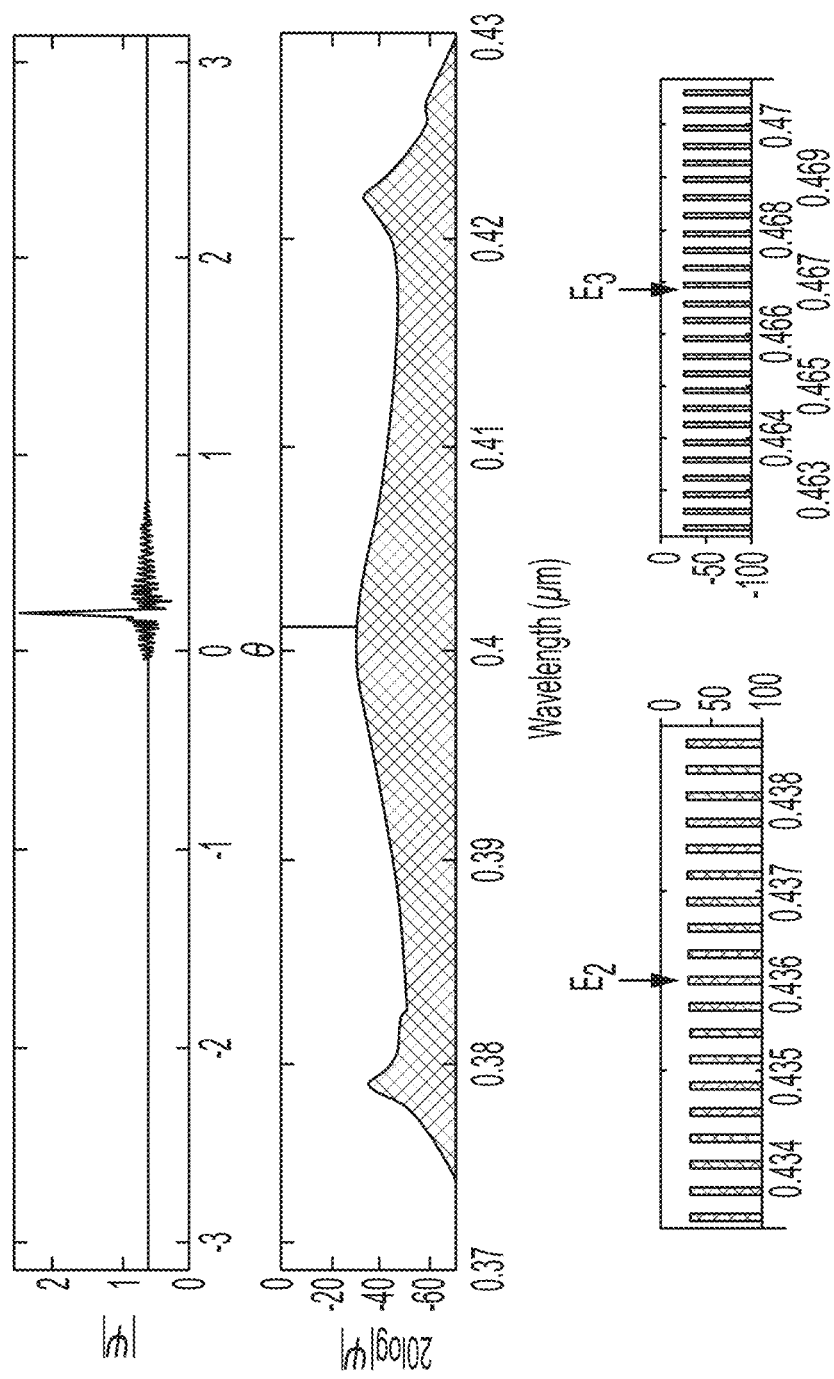
FIG. 10 is a diagram showing simulated performance of the comb frequency generator in FIG. 9.

In FIG. 9, a diagram shows a Kerr frequency comb generator 900 according to an example embodiment. The comb generator 900 includes a (tapered) waveguide 902 optically coupled to a ring-shaped (micro-)resonator 904. A continuous wave (CW) laser 906 injects light 907 into the waveguide 902 where it evanescently couples with the resonator 904 in the tapered region 902a. The resulting output 908 is a frequency comb as shown in FIG. 10. Using a heterostructure as described herein (e.g., with one layer formed of $Al_{x1}Ga_{1-x1}N$ and another layer formed of $Al_{x2}Ga_{1-x2}N$, where $x_1 \neq x_2$), this frequency comb may be located in the UV part of the optical spectrum. In FIG. 10 the frequency comb is shown being detected by an optical spectral analyzer (OSA) 910.

The frequency comb generator 900 utilizes multi-layered heterostructures that enables engineering the dispersion curve of the quasi-TE mode of an integrated photonic waveguide or a micro-ring resonator made from such a structure in order to achieve anomalous dispersion at a desired central (e.g., UV and short-wavelength visible) wavelength. This provides a technical feature usable to produce bright-soliton direct frequency comb generation at the aforementioned wavelengths.

The wave propagation inside the microcavity formed by bending the waveguide shown in FIG. 9 results in non-linear wave propagation. In order to conduct the soliton formation in the cavity, the Lugiato-Lefever equation (LLE) is considered with dispersion of the proposed waveguide and pumping at central wavelength of $\lambda$=450 nm as a continuous wave input. The LLE is as shown in Equation (3) below, where $\psi$ is the normalized intracavity signal, $\alpha=-2(\Omega_0-\omega_0)/\Delta\omega_0$ is the normalized detuning of the continuous wave pump ($\Omega_0$) from the cold cavity resonance at $\omega_0$, and $F=(2g_0/\Delta\omega_0)^{1/2}F^*_0 0$ is the normalized amplitude of the external excitation with $F_0$ being the amplitude of the external excitation, and $D_n$ is the $n^{th}$ order dispersion parameter in the polynomial Taylor expansion of the resonator dispersion around the pumping frequency; also, $\theta \in [-\pi, \pi]$ is the azimuth angle inside the resonator. Slow time (rescaled time) in this Equation (3) is also defined as $\tau=\omega_0 t/2$ where the $\omega_0$ is the linewidth of the resonant mode.

$$\frac{\partial \psi}{\partial \tau} = -(1+i\alpha)+\sum_{n=2}\frac{(-i)^{n-1}}{n!}\left(\frac{-1D_n}{\Delta\omega}\right)\frac{\partial^n \psi}{\partial \theta^n}+i|\psi|^2\psi+F \quad (3)$$

Considering the cold cavity dispersion which can be achieved having the dispersion of the constituent waveguide for traveling wave resonator, the dynamic of signal propagating inside the cavity can be analyzed to find proper detuning and power for which the dissipative Kerr solitons (DKS) are generated inside the cavity. The diagram in FIG. 10 demonstrates the bright-soliton generation inside a micro-resonator 904 with radius of R=40 μm when driven with a continuous wave laser at $\lambda$=442 nm with a normalized detuning of $\alpha$=3.5 and normalized power of $F^2$=3.85, which generates a single bright soliton with spectral more than 75 nm at the −70 dB window. This would ensure strong comb lines at the optical clock transitions ($E_1$ and $E_2$) of $^{171}Yb^+$. The insets also demonstrate the fine comb lines around the optical clock transitions of $171Yb^+$, which demonstrates the comb lines of the bright-soliton have strong amplitudes at these wavelengths.

In studying the soliton generation inside a cavity made from the crystalline AlGaN, the radius is chosen in such a way to avoid overlap of Raman gain with the cavity modes, for the Raman gain is stronger than the four wave mixing gain, which is responsible for efficient Kerr-comb generation. The stokes lines in AlGaN are about 18 THz away from the pump with a linewidth around 100 GHz, so the Raman gain spectrum would not have overlap with the resonant modes of the resonator as the free-spectral-range of the resonator is around 400 GHz to ensure the Raman gain would not compete with the FWM gain, allowing wideband Kerr-comb generation.

The wide spectral range of the generated Kerr-comb ensures strong comb lines at the optical clock transitions ($E_1$ and $E_2$) of $^{171}Yb^+$. Thus, the proposed structure can be used for realizing miniaturized and chip-based solution for optical clockwork based on $^{171}$Yb$^+$ ions. Furthermore, the disclosed dispersion engineering approach provides a systematic approach to achieve anomalous dispersion at short wavelengths with versatile applications in laser-cooling, quantum-photonics, metrology, spectroscopy, just to name a few applications. For example, the anomalous dispersion can result in the optical device transmitting optical information at a speed greater than 1 GHz in response to an optical input.

Figure 2:
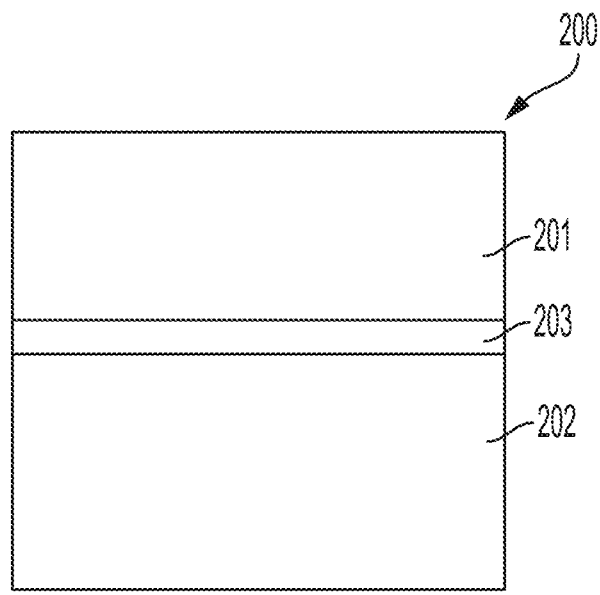
FIGS. 2-3 are cross-sectional views of optical devices according to example embodiments.
Figure 11:
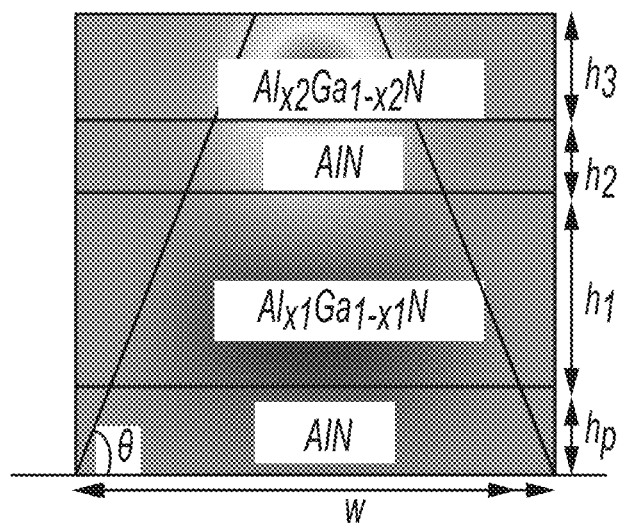
FIG. 11 is a cross-sectional view of an optical device according to an example embodiment.
Figure 12:
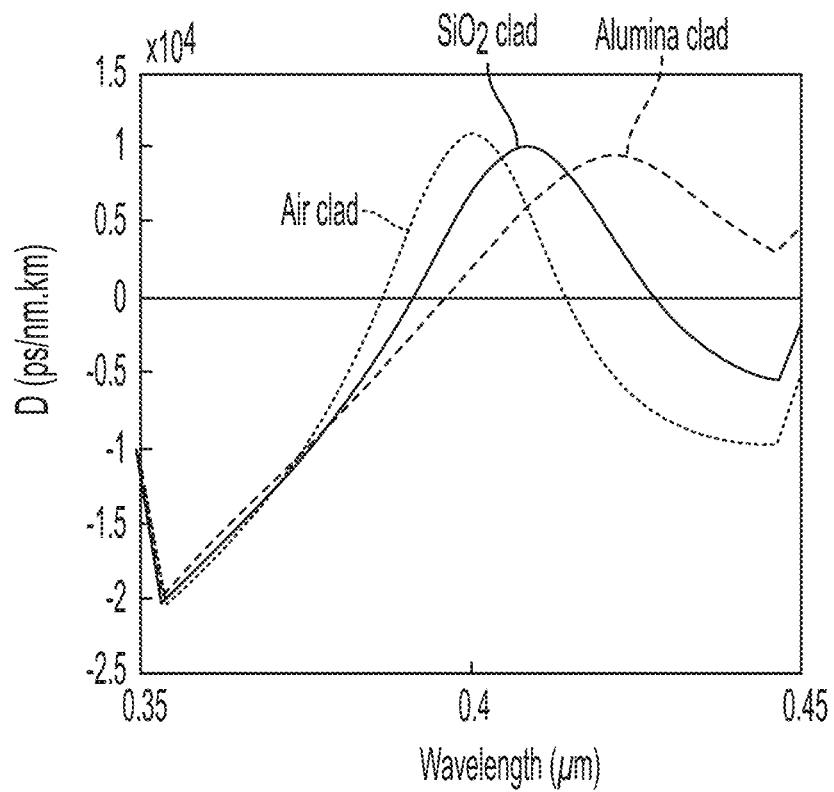
FIG. 12 is a graph showing dispersion characteristics based on a simulation of the optical device shown in FIG. 11.

The embodiments in FIGS. 2 and 3 are shown with substantially rectangular cross sections. In FIG. 3, slightly tilted sidewalls 308 are shown within the rectangular outline to indicate that etching may lead to tilted sidewalls, e.g., similar to the experimental results reported for LiNbO$_3$ waveguides fabricated via the inductively coupled plasma dry etch process (ICP). This necessitates careful consideration of the anisotropic properties of materials when designing the heterostructure. In addition, as shown in FIG. 11, tilted side walls (e.g., 60 degrees) can be intentionally achieved through selective area growth, or even due to selectivity of dry etching (ICP) as is the case for LN. In addition, a cladding material (e.g., surrounding the structures shown in FIGS. 2, 3, and 11) may be provided for device protection and will also have an effect on resonator Q factor, coupling to the waveguide, as well as dispersion. The effects of cladding material on dispersion are shown in the graph of FIG. 13 for air, SiO$_2$, and Al$_2$O$_3$ cladding.

A systematic design procedure as described above can achieve anomalous dispersion at UV and visible wavelengths where materials typically suffer from strong normal material dispersion. This is an improvement over conventional approaches to waveguide design, which do not provide sufficient anomalous dispersion to compensate for normal material dispersion. A layered waveguide or resonator design can obtain a strong curvature of the dispersion parameter near the avoided-crossing wavelength of a supermode. The resulting net anomalous dispersion enables bright-soliton frequency comb generation through driving a layered micro-resonator around this wavelength, or even generating supercontinuum in a layered waveguide by injecting a pulsed laser signal.

Figure 13:
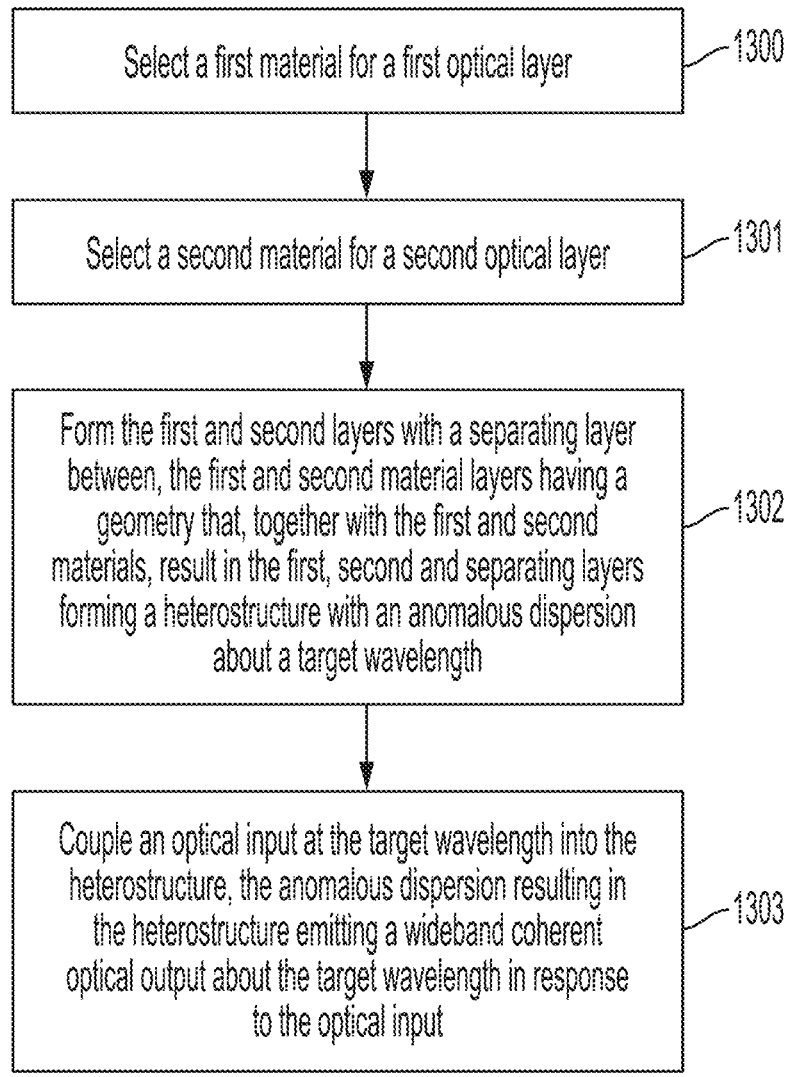
FIG. 13 is a flowchart of a method according to an example embodiment.

In FIG. 13, a flowchart shows a method according to an example embodiment. The method involves selecting 1300, 1301 first and second materials for first and second optical layers of an optical device. The first and second optical layers are formed 1302 with a separating layer therebetween. The separating layer has a lower refractive index than the first and second layers. The first and second material layers have a geometry that, together with the first and second materials, result in the first and second optical layers and the separating layer forming a heterostructure with an anomalous dispersion about a target wavelength. An optical input is coupled 1303 into the heterostructure. The optical input may include an optical continuous-wave or pulsed laser at the target wavelength. The anomalous dispersion of the heterostructure results in the emission of a wideband coherent optical output signal about the target wavelength in response to the optical input.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. An optical device, comprising:
    a first optical layer having a first dispersion response as a first function of wavelength, the first optical layer formed of a first III-V compound;
    a second optical layer having a second dispersion response as a second function of wavelength different than the first function, the second opticl layer formed of a second III-V compound different from the first III-V compound; and
    a separating layer between the first and second optical layers having a lower refractive index than the first optical layer and the second optical layer, a thickness of the separating layer selected such that the first and second dispersion responses combine to create an anomalous dispersion about a target wavelength that is between 250 and 500 nm, the anomalous dispersion resulting in the optical device emitting a wideband coherent optical output about the target wavelength in response to an optical input at the target wavelength.

2. The optical device of claim 1, wherein the first and second optical layers comprise high-index layers having different dispersion curves that are phase matched at the target wavelength to form an avoided-crossing at the target wavelength.

3. The optical device of claim 1, wherein a thickness of the separating layer controls a coherent coupling between the first and second optical layers, adjusts a curvature of anti-crossing, and a bandwidth of the anomalous dispersion in a heterostructure.

4. The optical device of claim 1, wherein the first and second optical layers are configured such that anti-crossing behavior of first and second dispersion curves results in a supermode of the optical device such that the anomalous dispersion about the target wavelength exceeds a normal material dispersion of the optical device about the target wavelength.

5. The optical device of claim 1, wherein the first and second optical layers are phase matched at the target wavelength and phase mismatched away from the target wavelength.

6. The optical device of claim 1, wherein the wideband coherent optical output comprises a quasi-transverse electric (TE) polarization.

7. The optical device of claim 1, wherein the wideband coherent optical output comprises a bright-soliton frequency comb.

8. The optical device of claim 1, wherein the optical device comprises a ring resonator that comprises the first and second optical layers and the separating layer, and wherein the optical input comprises a continuous wave laser.

9. The optical device of claim 1, wherein the optical device comprises a waveguide that is driven by an optical pulsed laser.

10. The optical device of claim 1, wherein the first and second optical layers are formed on a substrate made out of silicon, sapphire, GaAs, or SiC.

11. The optical device of claim 1, wherein the separating layer comprises at least one of AlGaN, AlGaInN, GaN, $Al_2O_3$, SiC, SiON, $Si_3N_4$, $HfO_2$, $Ta_2O_5$, $TiO_2$, TiN or $SiO_2$, as selected to achieve required dispersive properties.

12. The optical device of claim 1, wherein the optical device has tapered sides extending along a light propagation direction of the optical device.

13. An optical device, comprising:
a first optical layer having a first dispersion response as a first function of wavelength, wherein the first optical layer comprises $Al_{x1}Ga_{1-x1-y1}In_{y1}N$;
a second optical layer having a second dispersion response as a second function of wavelength different than the first function, wherein the second optical layer comprises $Al_{x2}Ga_{1-x2-y2}In_{y2}N$, wherein $x_1 \neq x_2$ or $y_1 \neq y_2$; and
a separating layer between the first and second optical layers having a lower refractive index than the first optical layer and the second optical layer, a thickness of the separating layer selected such that the first and second dispersion responses combine to create an anomalous dispersion about a target wavelength, the anomalous dispersion resulting in the optical device emitting a wideband coherent optical output about the target wavelength in response to an optical input at the target wavelength.

14. The optical device of claim 13, wherein the separating layer comprises a III-Nitride film.

15. The optical device of claim 13, wherein the first and second optical layers are formed on a single crystalline AlN layer.

16. A method comprising:
selecting first and second different III-V compounds for first and second optical layers of an optical device, the first and second different III-V compounds having different dispersion responses as a function of wavelength;
forming the first and second optical layers with a separating layer therebetween, the separating layer having a lower refractive index than the first and second optical layers, the first and second optical layers having a geometry that, together with the first and second III-V compounds, result in the first and second optical layers and the separating layer forming a heterostructure of the optical device with an anomalous dispersion about a target wavelength, the target wavelength being in a visible to UV spectrum; and
coupling an optical input into the heterostructure, the optical input comprising an optical continuous-wave laser at the target wavelength, the anomalous dispersion of the heterostructure resulting in emission of a wideband coherent optical output signal about the target wavelength in response to the optical input.

17. The method of claim 16, wherein the wideband coherent optical output signal comprises optical information at a speed greater than 1 GHz.

18. The method of claim 16, wherein the wideband coherent optical output signal comprises a bright-soliton frequency comb.

* * * * *